United States Patent
Wells

[11] 3,919,882
[45] Nov. 18, 1975

[54] TIRE INSPECTION APPARATUS AND METHOD

[76] Inventor: Donald R. Wells, 9452 Brynmar Drive, Villa Park, Calif. 92667

[22] Filed: Feb. 11, 1974

[21] Appl. No.: 441,146

[52] U.S. Cl. .................................... 73/146; 73/67.7
[51] Int. Cl.² ........................................ G01M 17/02
[58] Field of Search ....... 73/146, 67.2, 67.5 R, 67.7; 324/58.5 A, 58.5 B

[56] References Cited
UNITED STATES PATENTS

| | | | |
|---|---|---|---|
| 3,122,720 | 2/1964 | Morse | 73/67.7 X |
| 3,321,959 | 5/1967 | Wood et al. | 73/67.7 |
| 3,810,005 | 5/1974 | Bennion et al. | 73/67.5 R UX |
| 3,815,407 | 6/1974 | Lavery | 73/146 X |

FOREIGN PATENTS OR APPLICATIONS

| | | | |
|---|---|---|---|
| 213,401 | 12/1968 | U.S.S.R. | 73/67.5 R |

*Primary Examiner*—Jerry W. Myracle
*Attorney, Agent, or Firm*—Charles H. Schwartz

[57] ABSTRACT

A tire inspection apparatus and method for detecting separations in tires or other laminated structures including transmitting electrical energy toward a rotating tire to provide for a scattering of the electrical energy by separations within the tire and including at least a pair of receivers for receiving the scattered electrical energy and providing signal processing of the detected scattered energy to produce signals representing the slope or rate of change of the scattered energy and with one receiver responsive to scattered energy having an increasing rate of change and the other receiver responsive to scattered energy having a decreasing rate of change and for providing an output signal representing a separation only when both increasing and decreasing rate of change signals are detected at the same time. The transmitter may be located on the same side of the tire as the receivers and with the receivers detecting back-scattered energy or the transmitter may be located on one side of the tire and the receivers on the other side and with the receivers detecting forward-scattered energy.

15 Claims, 7 Drawing Figures

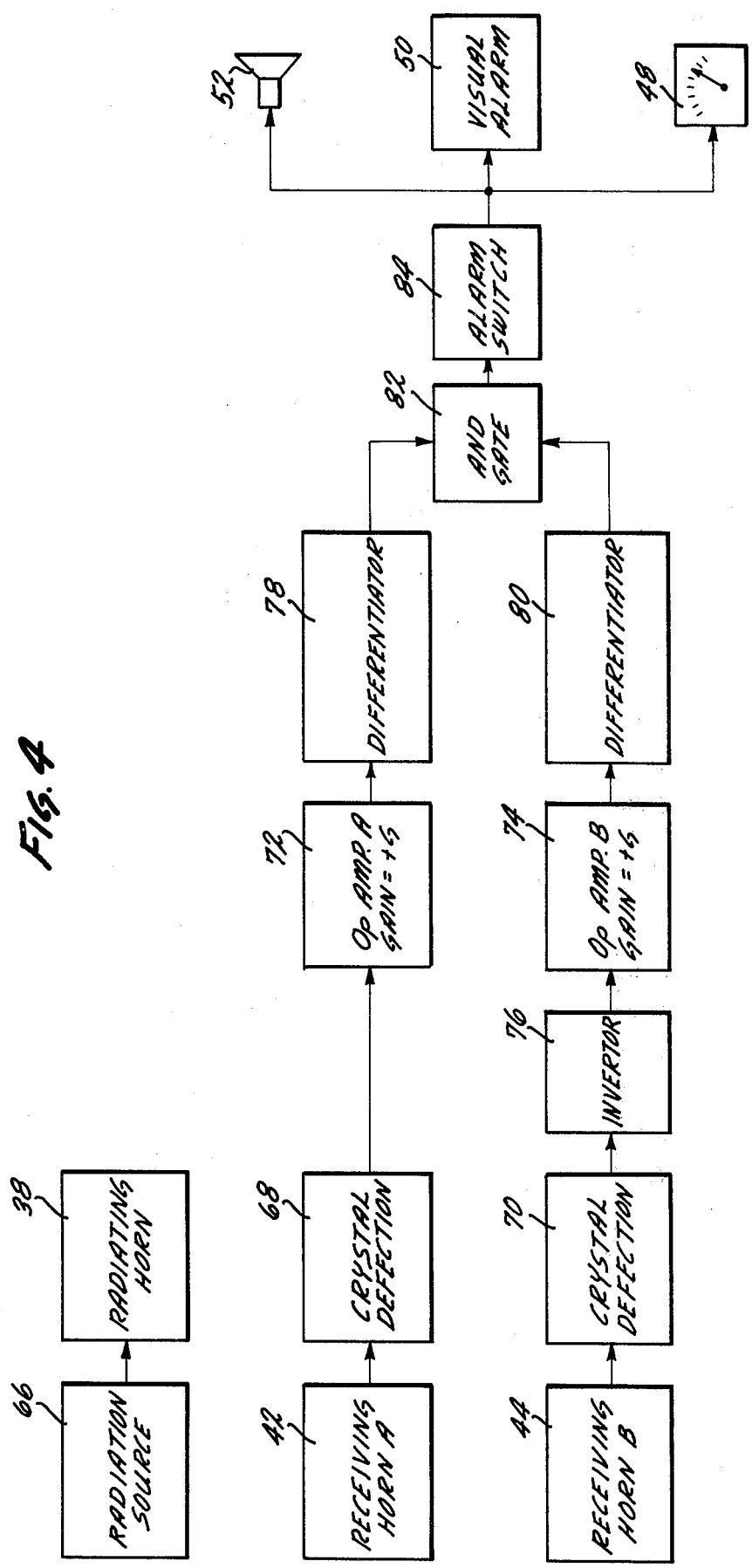

TIRE INSPECTION APPARATUS AND METHOD

The present invention is directed to a method and apparatus for detecting separations in tires or other laminated structures using a specific signal processing technique for providing a reliable and accurate indication of such separations. In the tire industry, the carcass of the tire is constructed of a plurality of bonded layers and with the integrity of the carcass being dependent upon a secure bond between the different layers. Any separation between these layers may result in the ultimate failure of the tire during use. Such a separation may initially start as a small area of unbond between two layers, and with this unbonding increasing during use of the tire. Once the area of unbonding reaches a sufficient size, this unbond, or separation, is now a potential failure point for the tire. For example, an area of unbond or separation of the size of a quarter is sufficiently large so that the tire should not be in use on a vehicle.

The detection of such flaws in a tire in accordance with the present invention may be accomplished with new tires so as to screen out potentially dangerous tires, but more importantly, the teachings of the present invention may by used by the recapping industry to insure that only tire carcasses which are sound will be recapped. For example, large truck tires are normally recapped many times before being discarded, and the recapping operation is relatively expensive, so that it is desirable to insure that only sound carcasses are to be recapped.

The prior art techniques for inspecting tires have generally included x-raying the tires to provide for a visual indication of tire flaws, or ultrasonic inspection generally using the absorption principles of ultrasonic waves. These prior art techniques are relatively cumbersome and time consuming and have not been used to any large extent by the tire industry.

The present invention is directed to a method and apparatus of detecting separations in tires or other laminated structures and in particular using the scattering characteristics of irradiated energy directed towards the tire, or other laminated structure. The invention will be described with reference to use in tire testing for complete tires or tire casings, but it is to be appreciated that the same signal processing technique of the present invention may also be used for detecting unbonds or separations in any laminated structures or any voids in laminated structures.

Generally, an electromagnetic transmitter irradiates electrical energy toward the tire to provide scattering of the electromagnetic energy from interfaces. For example, the outer face of the tire and the surrounding air is an interface and will provide for scattering of energy from this interface, but this scattering will be constant in amplitude, or essentially constant in amplitude, because such an interface exists around the circumference of the tire. On the other hand, any separations or unbonds within the layers of the tire will present a small discontinuity which will provide for scattered energy having a generally lobed configuration, usually including a main lobe and side lobes and with the electrical energy distribution having changes in amplitude with time as the tire rotates.

In order to discriminate between the wanted and unwanted scattered energy which represents separations as opposed to background or noise the invention includes using at least a pair of receivers positioned to detect the scattered energy as it is distributed between a pair of spaced points. The scattered energy as detected by the receivers is differentiated so as to provide for output signals representing scattered energy which is changing with time, so as to discriminate between background scattering and the desired detection of separations or unbonds.

Essentially, the detection system operates to discriminate between undesired signals and those from separations using the reflecting and scattering field properties of a small disc, rectangle, or other shaped interface existing within the tire which is created by a separation. The spatial distribution of the scattered electromagnetic field from such an irradiated separation has a lobed distribution in space so that a pair of receivers may be located on opposite sides of the lobed scattered radiation to detect signals which are varying in amplitude in opposite directions. This allows for the discrimination between scattered energy representing a separation and scattered energy which is merely background or noise, or which represents a steady state distribution representing the outer or inner faces of the tire.

The scattered energy having the lobed distribution will be produced from either a forward-scattering of the irradiated energy or a back-scattering of the irradiated energy. This allows for the transmitter to be either located on the same side of the tire as the receivers, or on the opposite side of the tire from the receivers. In addition, the transmitter may be located intermediate to the receivers, or may be located adjacent to the pair of receivers. In all cases, the receivers are responsive to the scattered energy and provide an output signal in accordance with the detection of such scattered energy. The background scattered energy, which is usually uniform in amplitude, or is slowly varying in amplitude, is eliminated by producing output signals representing scattered energy which is rapidly changing and with one receiver responsive to scattered energy which is increasing and the other receiver responsive to scattered energy which is decreasing and with the detection of a separation accomplished only with the coincident detection of scattered energy which is increasing from one receiver and decreasing from the other receiver. This coincident detection representing a separation is used to provide an output indication such as an audio or visual indication of the presence of a separation in the tire.

A clearer understanding of the invention will be had with reference to the following description and drawings wherein:

FIG. 4 is a block diagram of the electronic signal processing portion of the system of the tire testing apparatus of the present invention;

Figure 1:
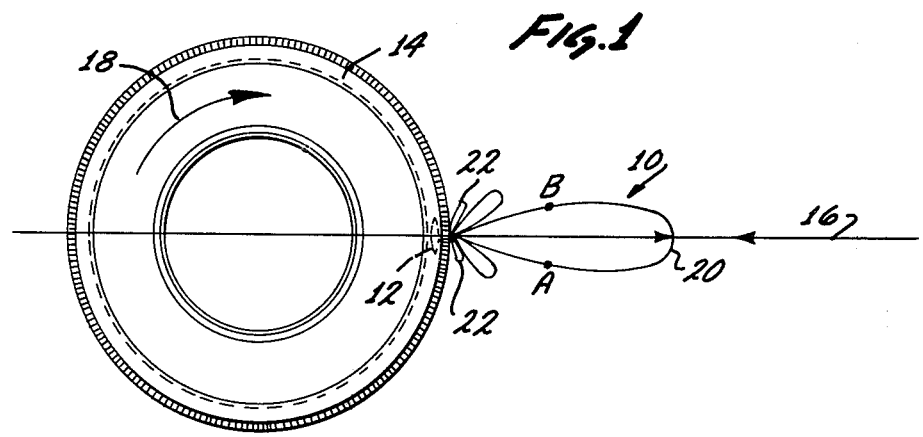
FIG. 1 illustrates the spatial distribution of energy such as electromagnetic energy scattered from an interply separation.

In FIG. 1 the spatial distribution 10 of energy such as electromagnetic energy is shown to be scattered from an interply separation 12 in a tire 14. Specifically, if electrical energy is directed towards the tire 14 from a direction as shown by arrow 16, and if the tire rotates as shown by arrows 18, the energy will intercept the various interfaces present within the tire 14 to provide for scattered electrical energy. For example, an interface exists between the outer face of the tire and the surrounding air, but energy scattered from such an interface will have a relatively steady state amplitude, or at most may have a slowly varying amplitude due to differences in the distance between the source of the irradiating energy and the outer face of the tire 14. However, when the irradiating energy intercepts a discontinuous interface such as caused by a small separation 12, this produces rapid change in the scattered energy to produce a characteristic lobe pattern 10 which generally includes a main lobe 20 and side lobes 22. Generally, this lobed pattern 10 will be produced by a separation either of small flat disc, a rectangle, or other shaped interface existing within the tire. As indicated above, the energy reflected from the tire's outer surface and in addition, from the tire's inner surface does not vary in time or space or at most has a relatively slow variation as opposed to the energy reflected or scattered from the separation which exhibits the lobed structure 10.

Figure 1A:
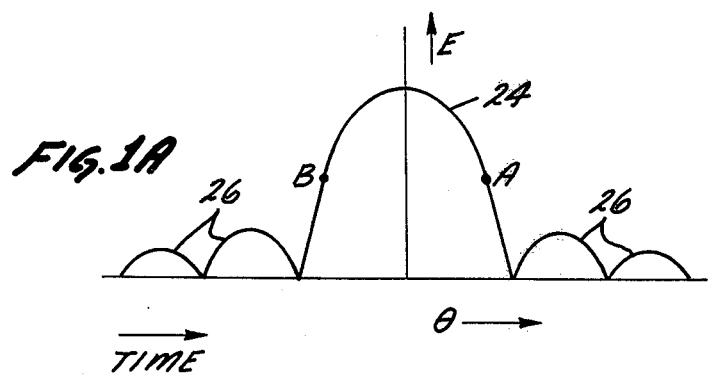
FIG. 1a illustrates the electrical signal produced from the spatially distributed energy with time.

FIG. 1a illustrates the lobed electrical energy pattern of FIG. 1 as converted to an electrical signal along a time base, which time base represents angular rotations of the tire 14 about its axis of symmetry. Generally, the amplitude E of the signal detected has the general characteristics shown in FIG. 1 wherein a large central portion 24 has the maximum amplitude of the signal and has steep sides and with a number of side bands 26 on both sides of the central portion and with the side bands of much smaller amplitude. Because the particular wave form shown in FIG. 1a, representing the voltage equivalent of the energy distribution pattern shown in FIG. 1, is representative of separations, the present invention uses at least a pair of receivers located at positions such as positions A and B shown in FIG. 1 and FIG. 1a so as to provide for the detection of a separation while at the same time discriminating against other scattered or reflected energy.

Figure 2:
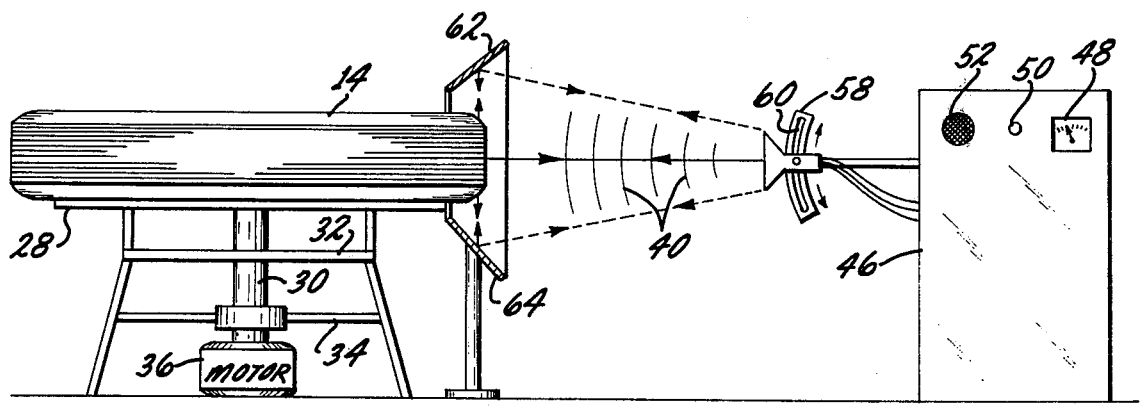
FIG. 2 illustrates a first embodiment of the tire testing apparatus of the present invention showing a side view.
Figure 3:
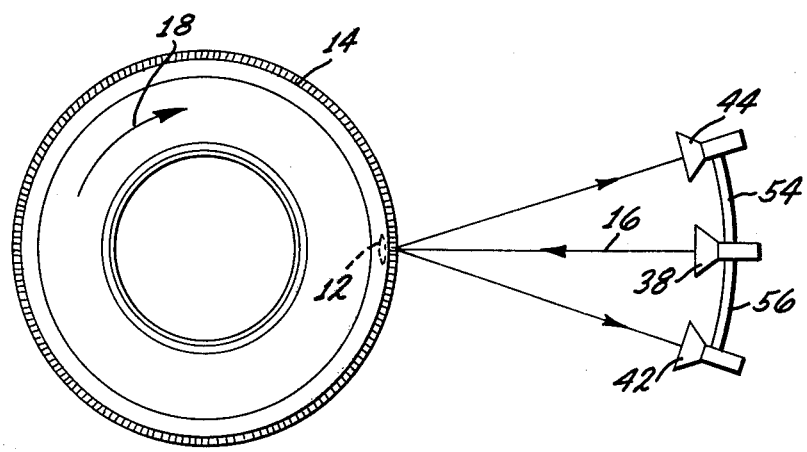
FIG. 3 illustrates a top view of the tire testing apparatus of FIG. 2.

FIGS. 2 and 3 illustrate the side and top views of a first embodiment of the invention using back-scattering of the electrical energy to provide for the detection of separations in the tire. Specifically, the tire 14 is mounted on a turntable 28 which provides rotation of the tire 14 about its axis of symmetry. Specifically, a shaft number 30 is rotatably mounted between bearing plates 32 and 34 and the rotation of the turntable 28 may be accomplished using manual or automatic means. For example, a motor 36 may provide rotation of the turntable 28 and the tire 14.

A radiating horn 38 provides for the radiation of electrical energy such as electromagnetic energy toward the tire in the direction shown by arrow 16 and the energy may be characterized as wave fronts shown by lines 40. The electrical energy when striking the tire provides for back-scattering and if a separation such as the separation 12 exists within the tire, then a wave pattern such as wave pattern 10 shown in FIG. 1 is produced. A pair of receiving horns 42 and 44 are positioned to receive the back-scattered energy and as shown in FIG. 1, the receiving horns would be located at positions A and B to detect the back-scattered energy at two points in space.

At some angular position in the rotation of the tire 14, the wave form of the back-scattered energy as conditioned by the separation 12 is positioned relative to the receiving horns 42 and 44 at positions A and B so that as shown in FIG. 1a each of the receiving horns receives electrical energy of approximately the same amplitude, but with the electrical energy decreasing at one receiving horn and increasing at the other receiving horn. This type of detection will not occur for other types of back-scattered energy which would be due to continuous interfaces in the tire, such as the outer face and inner face of the tire, and will also not be produced by other continuous irregularities in the tire, such as tread configuration, etc. for appropriately chosen radiation wave-length.

The electronics to provide for the electrical energy which is transmitted by the transmitting horn 38 and for the signal processing of the information received by the receiving horns 42 and 44 may be contained in a console 46. The console may include output indicators such as a meter 48, a light 50, and an audio alarm 52. In order to provide for the detection of separations, not only on the tread area of the tire 14, but also in the sidewalls, the radiating and transmitting horns may be coupled together with arm members 54 and 56 as shown in FIG. 3. The entire structure of the three horns may be mounted for angular displacement, using a slotted member 58 which incorporates a locking device such as a knob 60 to lock the horns in various angular positions, either in line with the tire 14, or in an up position or a down position. This provides for the radiation and detection to be directed to either one of a pair of reflecting mirrors 62 and 64 so that the energy may be directed toward the sidewalls for scattering by any separations in the sidewalls and with the scattered energy being reflected back by the mirrors 62 or 64 to the receiving horns 42 and 44.

FIG. 4 illustrates the electronic portion of the system for providing signal processing of the radiated and scattered electrical energy. Specifically, a source of radiation 66 provides energy for transmission to the tire 14 by the radiating horn 38, the source of radiation 66 may be any standard source, such as that used in radar systems, or may be sonic energy such as ultrasonic energy. The scattered radiation is detected as disclosed above by the receiving horns 42 and 44 and with the amplitude of the detected scattered radiation in accordance with the output signals from a pair of crystal detectors 68 and 70 or detectors suitable for the type of radiation chosen, be it electromagnetic or sonic.

The output of the crystal detector 68 is applied directly to an operational amplifier 72 and the output of the crystal detector 70 is supplied to an operational amplifier 74 after inversion by an inverter 76. The inverter 76 provides that the outputs from the operational amplifiers 72 and 74 are signals of the same polarity, but it is to be appreciated that the scattered signals when produced by a separation provide for signals at the receiving horns 42 and 44 wherein one signal is increasing in amplitude while the other signal is decreasing in amplitude. In order to provide for a detection of these increasing and decreasing signals, the output from the operational amplifiers 72 and 74 are applied to differentiators 78 and 80 which produces output signals proportional to the rate of change of the detected signals.

The output from the differentiators 78 and 80 are applied to an AND gate 82 which produces an output signal when both differentiators 78 and 80 provide signals of sufficient magnitude and only when both differentiators 78 and 80 provide such signals at approximately the same time. This coincident application of signals to the AND gate 82 represents the detection of the lobed pattern 10 shown in FIG. 1 which has the equivalent voltage wave form shown in FIG. 1a. Such a wave form, as explained above, is representative of a separation and does not represent steady state scattering conditions which would be produced by the outer face of the tire, or the inner face of the tire, or any slowly varying changes in the tire structure.

When the AND gate 82 receives the coincident signals from the differentiators 78 and 80, the AND gate provides for an output signal to an alarm switch 84 to activate the various alarm indicators 48, 50 and 52. Specifically, a meter 48 may provide for a deflection of a needle to indicate a separation and a visual alarm 50 such as a light may be turned on to also provide such an indication of a separation, or an audio alarm such as a speaker 52 may be activated to provide an audible indication of a separation present in the tire.

Figure 5:
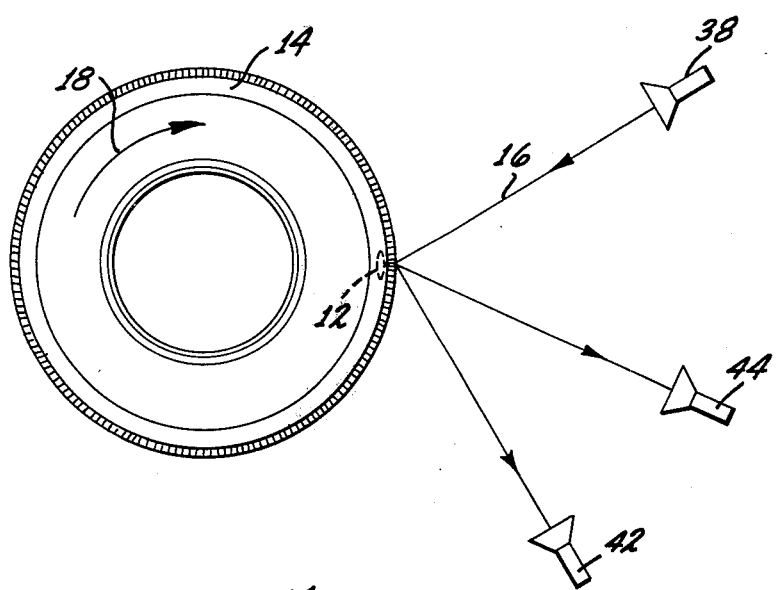
FIG. 5 illustrates a top view of a second embodiment of the tire testing apparatus of the present invention showing an alternate arrangement of the transmitter and receivers.

The particular relationship between the radiating horns and the receiving horns need not be that the specifically shown in FIGS. 2 and 3 wherein the radiating horn and receiving horn are located on the same side of the tire and with the radiating horn located intermediate to the receiving horns. The particular lobe scattering pattern shown in FIG. 1 would also be produced with the radiating horn located to one side of the receiving horns, and also using the back-scattering technique. This is shown in FIG. 5 wherein the tire 14 which has an interply separation 12 is rotated in a direction shown by the arrows 18. The radiating horn 38 is located to direct electrical energy toward the tire 14 as shown by the arrow 16. The pair of receiving horns 42 and 44 are positioned to one side of the radiating horn 38 and on the same side of the tire 14 as the radiating horn 38. The receiving horns 42 and 44 receive the back-scattered electrical energy in the same manner as that shown with reference to the embodiments of FIGS. 2 and 3, and the signal processing system shown in FIG. 4 is used to produce an output signal representative of a separation 12 in the tire 14.

Figure 6:
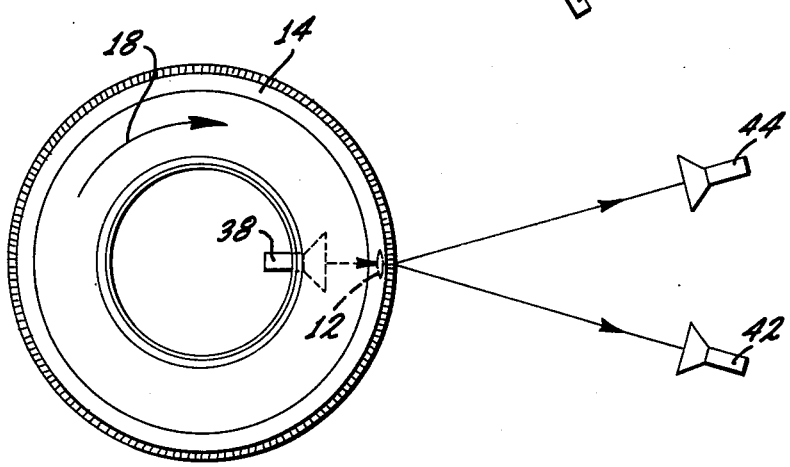
FIG. 6 illustrates a top view of a third embodiment of the tire testing apparatus of the present invention using a forward scattering of energy and showing a particular arrangement of the transmitter and receivers.

Another alternative embodiment of the invention is shown in FIG. 6, wherein the tire 14 is rotated in the direction shown by the arrows 18 about its axis of symmetry and with the tire 14 including a separation 12. The radiating horn 38 is positioned to one side of the tire and the receiving horns 42 and 44 are positioned to the opposite side of the tire. In the specific embodiment shown in FIG. 6, the radiating horn in positioned within the tire, and the receiving horns are positioned outside the tire, but it is to be appreciated that this positioning could be reversed, with the radiating horn located outside the tire, and the receiving horns located inside the tire. In either case, the electrical energy from the radiating horn 38 is directed towards the separation 12 to produce a forward-scattering of the electrical energy due to the separation 12.

The energy distribution of the forward-scattered energy is essentially similar to the scattered energy distribution 10 shown in FIG. 1 in that the forward-scattered energy also has a lobed structure with a large central lobe and side lobe portions. The receiving horns 42 and 44 are positioned at points A and B to detect the forward scattered energy as the tire 14 rotates and to produce output signals in accordance with the forward-scattered energy. A signal processing system as shown in FIG. 4 is used to produce the output indication of a separation in the tire in accordance with the forward-scattered energy.

It can be seen that the present invention is therefore directed to an apparatus and method for detecting separations in tires or other laminated structures using a signal processing technique wherein at least one transmitter, or radiator provides for electrical energy directed towards the laminated structure and with at least a pair of spaced detectors or receivers detecting the scattered electrical energy at two points, and with an output indication representative of a separation being produced when scattered electrical energy is detected at both points at the same time, and with the electrical energy at one point increasing and the electrical energy at the other point decreasing so as to detect the lobed scattered energy distribution produced by a separation in the laminated structure.

It is to be appreciated that although the invention is described with reference to a pair of spaced detectors and a single transmitter, the signal processing technique may also be accomplished using a single transmitter and a single detector with the single detector sampling the scattered electrical energy at a first point in time as the tire rotates, and with that sampled energy held while the detector samples the scattered electrical energy at a second point in time, and with the energy sampled at the second point in time compared with the energy sampled at the first point in time so as to detect the lobed scattered energy distribution produced by a separation in the laminated structure. Using such a system, the single detector provides for the detection of the scattered electrical energy at the first and second spaced points and is the equivalent of a pair of spaced detectors and when the term "a pair of spaced detectors" is used in this application it includes the use of a single detector detecting the scattered energy at different points in time.

Although the invention has been described with reference to particular embodiments, it is to be appreciated that other adaptations and modifications may be made and the invention is only to be limited by the appended claims.

I claim:

1. An inspection apparatus for detecting separations in laminated structures, including, first means for radiating energy toward the laminated structure to provide for the scattering of the energy and with the spatial distribution of the scattered energy in accordance with any separations with the laminated structure, second means for detecting the scattered energy and including at least a pair of spaced detectors to detect the scattered energy at at least a pair of spaced positions and for producing first signals in accordance with the detected scattered energy, third means for providing relative movement between the laminated structure and the first and second means as a group, fourth means coupled to the second means for differentiating the first signals for producing second signals in accordance with the rate of change of the first signals, and fifth means coupled to the fourth means for producing an output signal in accordance with the second signals including at least a pair of coincident signals representing scattered energy increasing at one spaced position and decreasing at the other spaced position.

2. The inspection apparatus of claim 1 for detecting separations in tires and wherein the third means provides rotation of the tire around its axis of symmetry.

3. The inspection apparatus of claim 1 wherein the first means radiates electromagnetic energy toward the laminated structure and the second means detects the scattered electromagnetic energy.

4. The inspepcting apparatus of claim 1 additionally including an AND gate and wherein one of the pair of coincident signals is inverted and with the coincident signals after the one signal is inverted coupled to the AND gate to produce the output signal.

5. The inspection apparatus of claim 1 additionally including sixth means coupled to the fifth means for producing an output indication in accordance with the output signal.

6. A tire inspection apparatus for detecting separations between the bonded layers of the tire, including
first means for radiating energy toward the tire to provide for the scattering of the energy and with the spatial distribution of the scattered energy in accordance with any separations within the bonded layers of the tire,
second means for detecting the scattered energy and including at least a pair of spaced detectors to detect the scattered energy at at least a pair of spaced positions and for producing first signals in accordance with the detected scattered energy,
third means for providing relative movement between the tire and the first and second means as a group, around the axis of symmetry of the tire,
fourth means coupled to the second means for producing second signals in accordance with the rate of change of the first signals and for producing at least a pair of signals representing the scattered energy of the pair of spaced positions, and
fifth means coupled to the fourth means for producing an output signal in accordance with the coincidence of the pair of signals representing the scattered energy at the spaced positions.

7. The tire inspection apparatus of claim 6 wherein te fifth means produces the output signal when the pair of signals represents scattered energy increasing at one spaced position and decreasing at the other spaced position.

8. The tire inspection apparatus of claim 7 wherein one of the pair of coincident signals is inverted and with the coincident signals after the one signal is inverted coupled to an AND gate to produce the output signal.

9. The tire inspection apparatus of claim 6 wherein the first means radiates electromagnetic energy toward the tire and the second means detects the scattered electromagnetic energy.

10. The tire inspection apparatus of claim 6 additionally including sixth means couled to the fifth means for producing an output indication in accordance with the output signal.

11. A method for detecting separations in laminated structures, including the following steps,
radiating energy toward the laminated structure to provide for the scattering of the energy and with the spatial distribution of the scattered energy in accordance with any separations within the laminated structure,
detecting the scattered energy using at least a pair of spaced detectors to detect the scattered energy at at least a pair of spaced positions,
producing at least a pair of first signals in accordance with the detected scattered energy at the pair of spaced positions,
providing relative movement between the laminated structure and the first and second means as a group,
producing at least a pair of second signals in accordance with the rate of change of the pair of first signals, and
producing an output signal in accordance with the coincidence of the pair of second signals.

12. The method of claim 11 wherein the output signal is produced only when the pair of first signals represents scattered energy increasing at one spaced position and decreasing at the other spaced position.

13. The method of claim 12 including the step of inverting one of the pair of second signals.

14. The method of claim 11 for detecting separations in tires and wherein the rotation of the tire is around its axis of symmetry.

15. The method of claim 11 additionally including the step of producing an output indication in accordance with the output signal.

* * * * *